Feb. 24, 1970     A. S. BOHRER ET AL     3,496,821
SCROLL SAW
Filed May 15, 1968     3 Sheets-Sheet 1
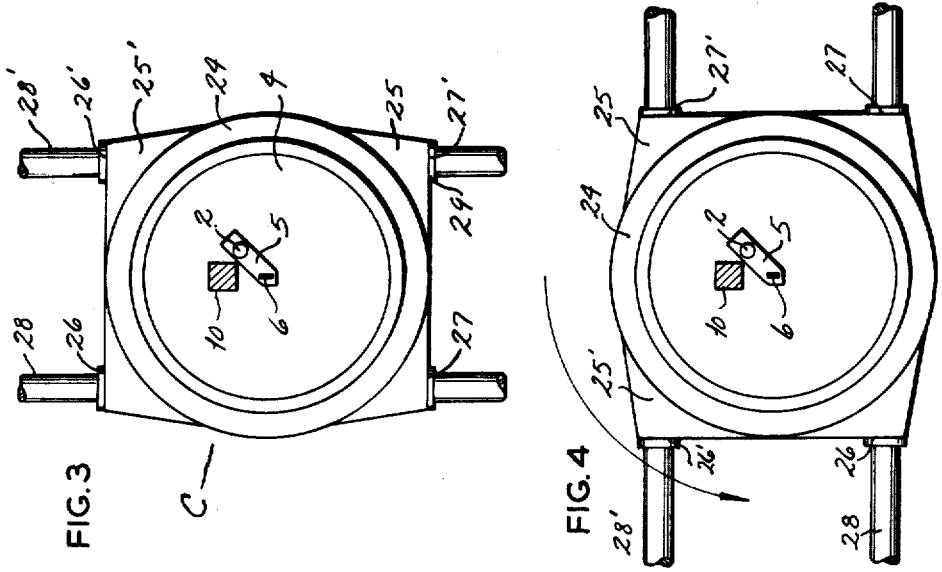
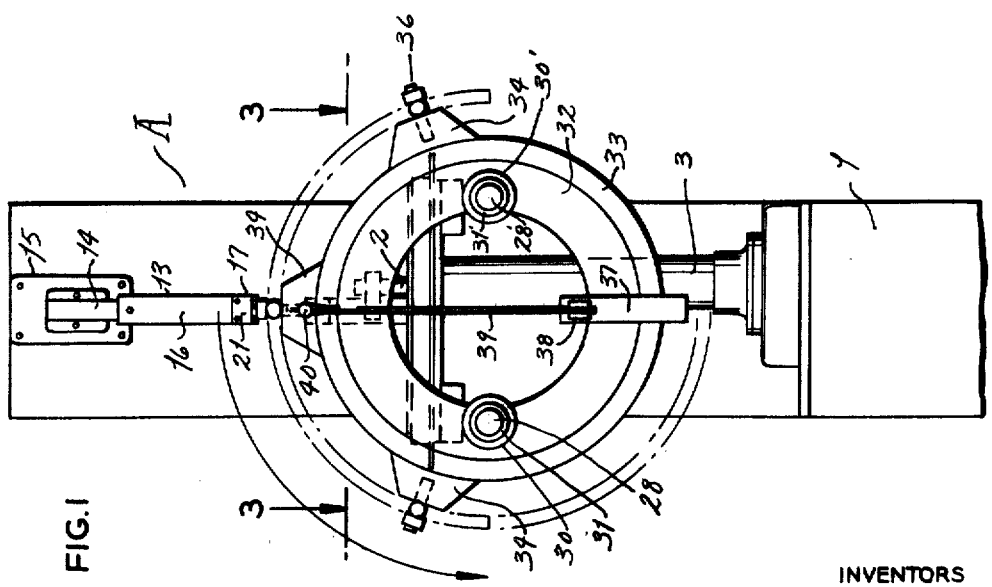
INVENTORS
ALPHONSE S. BOHRER
KARL ANDREW BAURIDL
BY Ralph W. Koeck
ATTORNEY

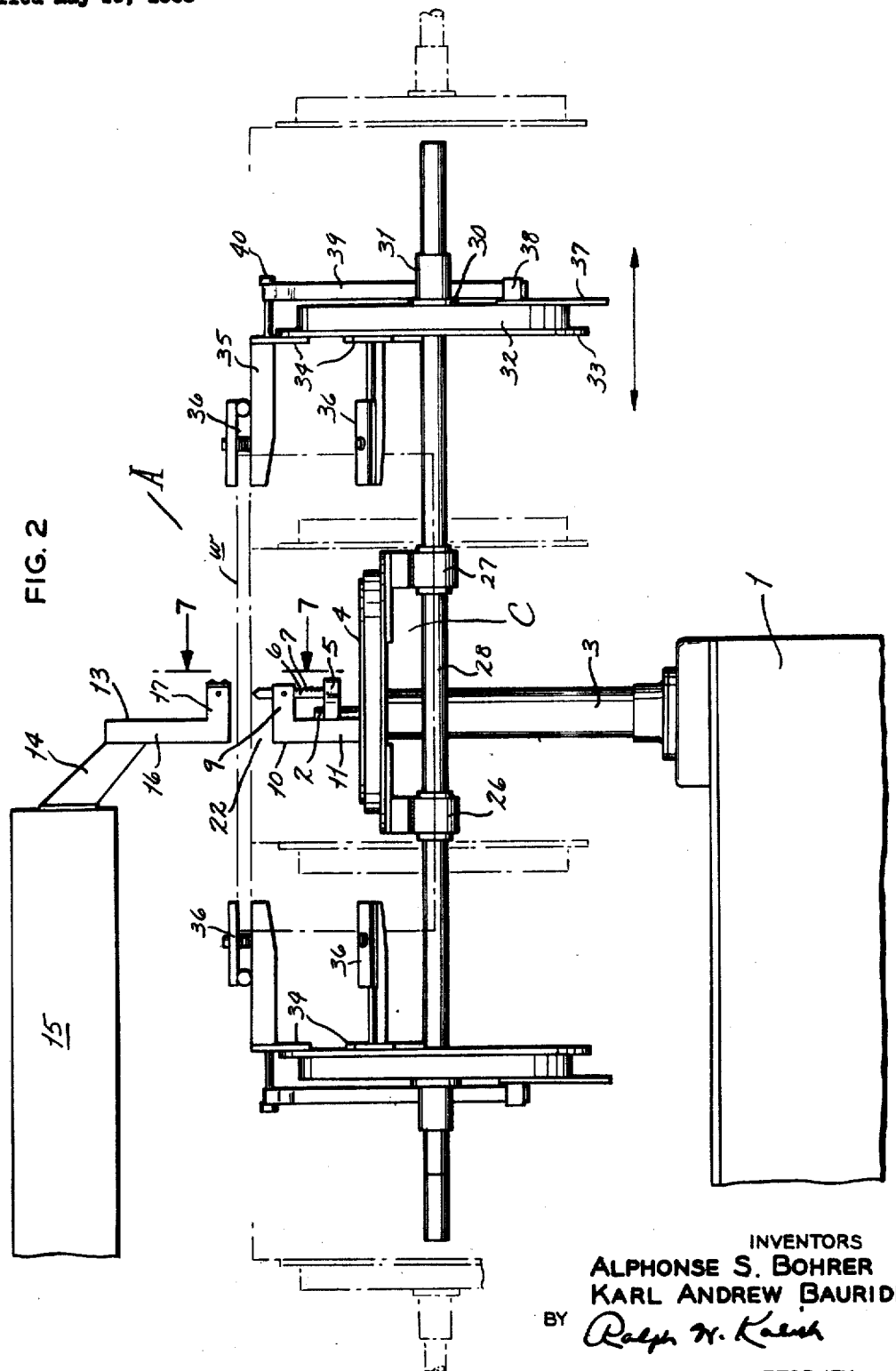

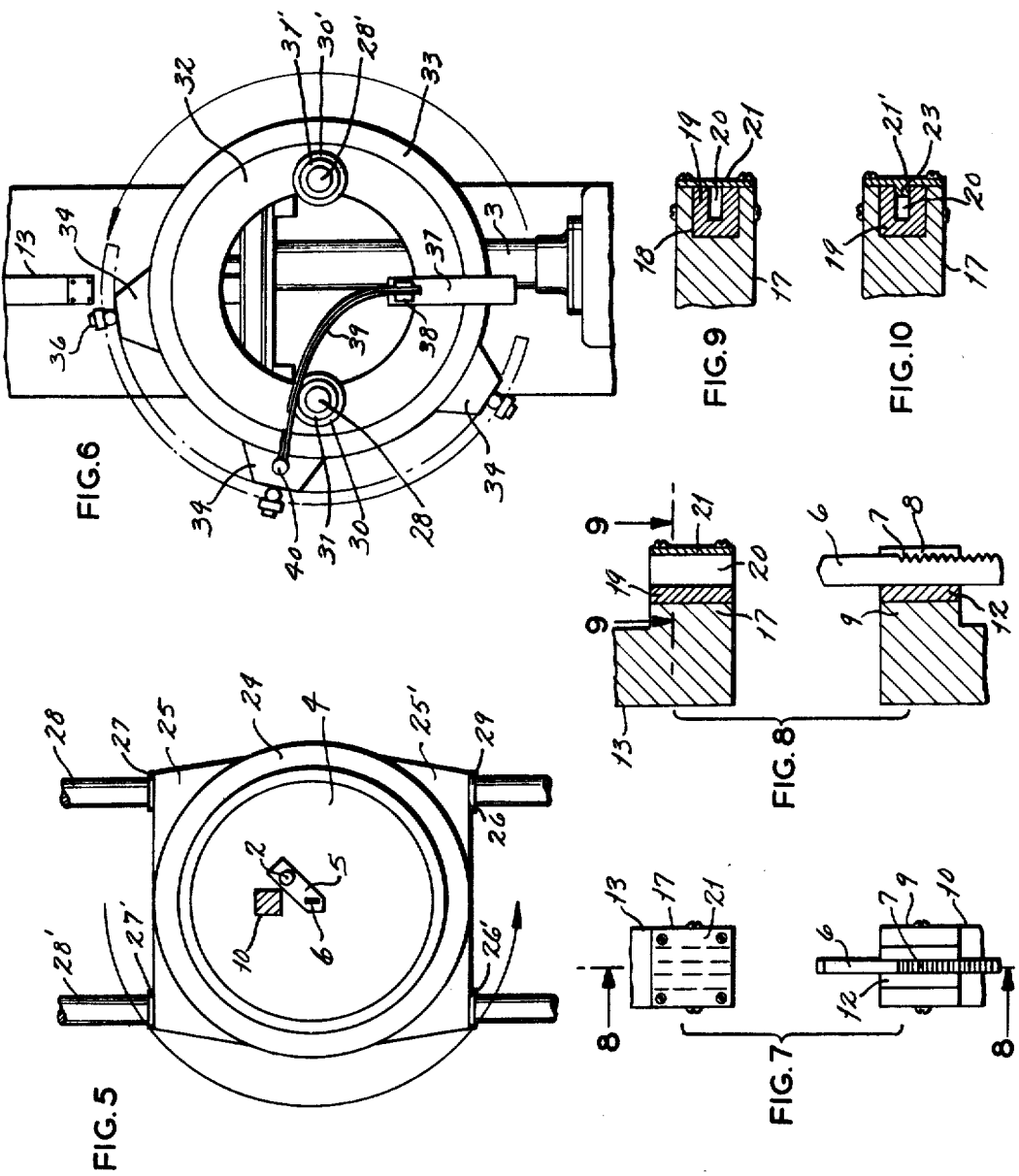

United States Patent Office 3,496,821
Patented Feb. 24, 1970

3,496,821
SCROLL SAW
Alphonse S. Bohrer, 6932 Zaharias Court 63129, and
Karl Andrew Bauridl, 10649 Twilight Drive 63128,
both of St. Louis County, Mo.
Filed May 15, 1968, Ser. No. 729,166
Int. Cl. B23d 51/04; B26d 7/06
U.S. Cl. 83—412                                8 Claims

ABSTRACT OF THE DISCLOSURE

A scroll saw for cutting arcuate or parti-cylindrical work pieces, as for forming rotary dies, comprising a vertically reciprocating saw blade operating within a path normal to the horizontal and a carriage for retaining a work piece, which carriage is adapted for moving said work piece relative to said saw so that the effected line of cutting will be along the shortest path between the inner and outer faces of the work piece being cut and through the point of tangency of a tangent normal to the reciprocating path of the saw blade. The carriage is adaptable for moving the work piece in a path longitudinally of the machine; in a path rotatively about a horizontal axis extending lengthwise of the machine; and rotatively in a path within a horizontal plane about a vertical axis.

BACKGROUND AND SUMMARY OF THE INVENTION

This invention relates in general to motor driven saws and, more particularly, to a saw for cutting patterns in arcuate or parti-cylindrical work pieces.

Heretofore, there has been a widely recognized problem in cutting the grooves within arcuate bodies as used in the formation of rotary dies. Thus, a prescribed pattern of cutting must be provided in such bodies so that steel rules may be suitably fixed therein for creating the particular die for the intended purpose, such as, for creasing, perforating, cutting, etc. The problem has been to assure that despite the curvature of the body, the grooves for the steel rules are cut so there will be no distortion of the ultimate die. By reason of currently used equipment, the lines of cutting have not coincided with radii extending through the arcuate body from the center upon which the same is formed, but have been perforce cut along lines which intersect such radii resulting in the component portions of the pattern being formed on a plurality of centers. Thus, said lines of cutting have been at an angle of less than 90 degrees to a tangent passing through the outer end of the line of cutting. It is apparent that with steel rules received within such lines of cutting, a wholly inaccurate and distorted, and, hence, unuseful, die is developed.

Therefore, it is an object of the present invention to provide a saw which is adapted to cut an arcuate work piece along a path which constitutes the shortest distance between the outer and inner face thereof.

It is a further object of the present invention to provide a saw of the character stated incorporating novel means for easily presenting a cutting pattern upon an arcuate surface to the cutting implement.

It is another object of the present invention to provide a saw of the character stated which incorporates a saw adapted for travel reciprocatingly through an axis normal to the horizontal and which embodies a work retaining carriage adapted to easily move the work with respect to said saw without requiring constant repositioning of the work.

It is a still further object of the present invention to produce a saw of the character stated having novel work retaining carriage means for allowing movement of the work with respect to the saw in a multiplicity of directions such as rotatively about a vertical axis, rotatively about a horizontal axis, and lengthwise of the saw.

It is another object of the present invention to provide a saw of the character stated having a unique work supporting carriage with which the work is so integrated as to provide a convenient surface for manipulation of the carriage.

It is another object of the present invention to provide a saw of the character stated which allows for high speed, accurate operation; which may be most economically produced; the components of which may be readily adapted to existing saws; and which is highly reliable in operation.

BRIEF DESCRIPTION OF THE DRAWINGS

FIGURE 1 is an end elevational view of a scroll saw constructed in accordance with and embodying the present invention with various positions of the work being shown in phantom lines.

FIGURE 2 is a side view of the scroll saw.

FIGURE 3 is a fragmentary top plan view taken on the line 3—3 of FIGURE 1, illustrating the carriage center wheel in normal, initial position.

FIGURE 4 is a top plan view taken substantially on the line 3—3 of FIGURE 1 but illustrating the carriage center wheel as turned through an angle of 90 degrees from that shown in FIGURE 3.

FIGURE 5 is a fragmentary top plan view taken substantially on the line 3—3 of FIGURE 1 illustrating the carriage center wheel as turned through an angle of 180 degrees from the position shown in FIGURE 3.

FIGURE 6 is an end view illustrating the work supports as turned through an angle about an axis extending longitudinally of the carriage.

FIGURE 7 is a vertical transverse sectional view taken on the line 7—7 of FIGURE 2.

FIGURE 8 is a vertical transverse sectional view taken on the line 8—8 of FIGURE 7.

FIGURE 9 is a horizontal transverse sectional view taken on the line 9—9 of FIGURE 8.

FIGURE 10 is a horizontal transverse sectional view taken substantially on the line 9—9 of FIGURE 8 but illustrating another form of saw blade guide.

DESCRIPTION OF THE PREFERRED EMBODIMENT

Referring now by reference characters to the drawings which illustrate the preferred embodiment of the present invention, A generally designates a scroll saw incorporating a unique work receiving carriage C for adapting said saw to cut patterns in rotary dies for reception therein of steel rules so as to render said dies useful for customary purposes, such as creasing, cutting, perforating, and the like. An example of a parti-cylindrical work piece for development of a rotary die is indicated at w in phantom lines in FIGURES 1, 2 and 6, and is fabricated of any suitable material, particularly wood.

Saw A includes a base or mounting 1 for disposition upon the floor or the support surface and which includes drive means (not shown) for reciprocatingly operating a shaft or arm 2, or the like, disposed within a hollow upright 3 seated upon mounting 1 and extending upwardly thereof. Shaft 2 projects beyond the upper end of upright 3 and through an aligned opening (not shown) provided in an annular plate 4 mounted on the upper end of said upright 3 and which, as will be shown, constitutes a bearing. Upwardly of plate 4, shaft 2 carries a short arm 5 axially normal thereto, and which is provided with a socket (not shown) for receiving the lower end of a scroll saw blade 6, as of the well known saber type, having a plurality of cutting teeth, as at 7. The upper portion of said blade 6, spaced from the upper extremity thereof, is directed through a forwardly opening guideway 8 carried in the outer end of the horizontal arm 9 of an angle shaped guide 10 having a vertical leg 11 fixed at its lower end upon plate 4. Said guideway 8 is preferably defined by a U-shaped insert 12 fixed in a recess at the outer end of arm 9 of guide 10.

Presented at a predetermined distance above guide 10 is a cooperating overhanging guide 13 which may be secured in position by any desired means, such as through a mounting arm 14 to an overhead component 15. Guide 13 embodies a vertical leg 16 which is integral at its lower end with a horizontal section 17 in axially parallel aligned relationship to horizontal arm 9 of guide 10 (see FIGURES 7 and 8). In its end portion remote from leg 16, horizontal section 17 is provided with a recess 18 opening through the end thereof and through its upper and lower faces for receiving a guide element 19 being of generally U-shape in cross section so as to define a guideway 20 in vertical alignment with guideway 8 of member 10. The normally end opening of way 20 is closed by an end plate 21 extending thereacross and fixed to the adjacent end surfaces of horizontal section 17 (FIGURES 8 and 9). Way 20 is of such area as to closely receive the upper end of saw blade 6 for assuring movement thereof at all times in a vertical path, that is, against any undesired lateral tilting so as to accomplish effective sawing opeartion within the predetermined path.

It is to be observed that the spacing, as indicated at 22, between guide members 10 and 16, must be such as to present requisite distance between the under face of horizontal section 17 and the upper extremity of blade 6 when the latter is in full downward position (FIGURE 2) so as to allow of presentation of work, as indicated by workpiece w, therebetween.

As shown in FIGURE 10 there may be another form of end plate 21' provided for cooperation with guide element 19 so as to further constrict the cross sectional area of guideway 20 by integrally incorporating a short tongue 23 for partial extension into said way 20.

As may be seen in FIGURES 3, 4 and 5, shaft 2 is eccentrically located with respect to plate 4 by reason of the eccentric relationship of upright 3 to said plate 4 (see FIGURE 1) for purposes presently appearing.

It will thus be observed that blade 6 is presented co-axially with plate 4 and, hence, laterally off-set with respect to upright 3.

Plate 4 which, as stated above, constitutes a bearing as it incorporates along its circumferential face an inner race (not shown) of a ball bearing (not shown), the outer race (not shown) of which is carried within an outer wheel or ring 24 of carriage C so that said carriage, as fully described hereinbelow, may thus be freely rotated with respect to plate 4 as suggested by arrows in FIGURES 4 and 5. Carried on wheel 24, as by welding to the under face thereof, are mounting plates 25, 25' each of which carries a pair of laterally spaced-apart sleeves 26, 26', 27, 27', respectively, which sleeves 26, 27 and 26', 27' are in respective axial alignment for extension therethrough of elongated shafts 28, 28', respectively, said shafts being co-planar and axially parallel, being downwardly of opposite sides of wheel 24. Bushings 29 are provided within each sleeve 26, 26', 27, 27' so as to render said shafts 28 easily slideable lengthwise therethrough.

In each of their end portions, shafts 28, 28' are suitably supported within sleeves 30, 30', respectively; said sleeves 30, 30' having bushings 31, 31' for conducing to axially slidable movement of said shafts. Sleeves 30, 30' are carried in diametrally opposed locations upon a bearing ring 32, the plane of which is perpendicular to the support surface. Provided about the periphery of each bearing ring 32 is the inner race (not shown) of a ball bearing (not shown), the outer race of which is carried upon an annular mounting member 33 which, by reason of said ball bearing, is thus adapted for relative rotational movement with respect to bearing ring 32. Upon the inner face of each annular mounting member 33 there is provided a plurality, as for instance, three, of circumferentially spaced-apart, radially extending plates 34, each of which is integral on its face directed toward saw blade 6 with one end of a relatively short bar 35, the longitudinal axis of each of which is parallel to that about which annular mounting 33 is rotatable and thus extending in a direction lengthwise of carriage C. Each bar 35 on its radially outwardly directed surface mounts a work clamp, indicated generally at 36. Mounted on the lower portion of the endwise face of each bearing ring 32 is a narrow plate 37 for suitable securement, as by a bracket 38, to the lower end of a flat spring, as of leaf character, 39, the upper end of which is engaged upon a pin 40 projecting from one plate 34 in a direction endwise of carriage C. As indicated in FIGURE 1, spring 39 is biased into vertical disposition so as to present annular member 33 in such relationship to bearing member 32 that the plate 34 carrying pin 40 will be presented in uppermost disposition and, hence, upon an axis extending lengthwise of carriage C. Thus, movement of mounting member 33 about bearing member 32 will, perforce, place a stress upon spring 39 so as to urge said mounting member 33 into its initial position.

In operation with saw blade 6 in downward disposition, (FIGURE 2), a transversely arcuate workpiece w, such as the parti-cylindrical body for a rotary die, is presented to scroll saw A by having one side edge lead transversely through spacing 22 and with its end edges being gripped within clamps 36. It is apparent that by reason of the ease of relative slideability of shafts 28, 28' within sleeves 30, 30', bearing rings 32 may be moved relatively toward or away from each other along said shafts 28, 28' for suitably accommodating the length of the particular workpiece w upon which operation is to be effected.

It is understood that the upper surface of workpiece w will have suitably inscribed or otherwise indicated thereon, the particular pattern or line of cutting which is to be effected to provide the grooves for receiving the steel rules. It is, of course, obvious that at certain junctures throughout the inscribed pattern, enlarged openings may be cut to receive saw blade 6 in a facile manner for presentation at the commencement of any particular line of cut.

As is apparent from the foregoing, saw blade 6 will reciprocate within a vertical path which will be normal to the point of tangency of that portion of workpiece w immediately within the path of saw blade 6. Such point of tangency will, perforce, lie within a line parallel to the horizontal so that as blade 6 cuts through workpiece w it will follow the shortest path between the inner and outer surfaces thereof. Accordingly, the line of cutting through workpiece w will coincide with a radius extending from the center upon which workpiece w is formed. By assuring that the line of cutting through workpiece w will be on such radius, the steel rule or other die-forming elements received within such line of cutting will provide an accurate, undistorted pattern.

During the sawing operation the clamped workpiece w thus becomes integrated with carriage C and may serve as a ready surface for manipulating carriage C so as to allow the pattern provided on workpiece w to be directed to saw blade 6. The versatility of carriage C for easily and effectively presenting the work to saw blade 6 is apparent by reason of the fact that the same is adapted to allow of swinging within a horizontal plane about a vertical axis (see FIGURES 4 and 5); by allowing for longitudinal adjustment, by sliding action along shafts 28, 28' to workpiece w and the bearing rings 32 to which they are united at their ends through clamps 36 and annular mounting members 33 (FIGURE 2); and by rotation of the work about a longitudinally extending horizontal axis (FIGURES 1 and 6).

In the first mentioned movement, carriage C with workpiece w readily swings in a horizontal plane by reason of the relative movement of the wheel 24 about the plate-bearing 4. The movement longitudinally of scroll saw A is readily understood since shafts 28, 28' serve as slide members along which ring bearings 32, together with the engaged workpiece w, are easily pushed or pulled as may need be with adequate pressure being applied to unworked areas of workpiece w for such purposes.

In order to cause a rocking of workpiece w about a horizontal axis which extends longitudinally of scroll saw A, the operator need merely push upon the workpiece w in a clockwise or counterclockwise direction, as need be, by which mounting members 33 will readily rotate about the related ring bearings 32. Such movement will, as stated above, place spring 39 under tension so that upon release of such pressure workpiece w will be caused to be returned to that condition wherein spring 39 is without stress. As clearly seen in FIGURES 1 and 6, column 3 is eccentric with relationship to plate 4 and by being off-set from the axis passing through the center of the latter, adequate clearance is provided so that workpiece w may be rotated a sufficient distance to allow sawing upon its side edges. Thus, column 3 prevents undue interference with the rotative movement of workpiece w so that its entire surface, from side edge to side edge (as well from end edge to end edge) is presentable to saw blade 6 for the desired action.

From the foregoing the versatility of scroll saw A is readily recognized and the efficiency of the same in providing appropriate grooves within rotary die bodies is apparent. Consequently, by use of the present invention, accuracy and lack of distortion in rotary dies is assured since all grooves will be cut upon corresponding radii. Furthermore, scroll saw A may be easily operated and most economically produced.

It shoud be understood that changes and modifications in the formation, construction, and arrangement and combination of the several parts of the Scroll Saw may be made and substituted for these herein shown and described without departing from the nature and principle of our invention.

Having thus described our invention, what we claim and desire to obtain by Letters Patent is:

1. A scroll saw for use with a transversely arcuate workpiece comprising a base, an upright provided on said base and being hollow, an annular plate provided on said upright and having an opening aligned therewith, a shaft extending upwardly through said upright and plate opening for extension therebeyond, means for effecting vertical reciprocal action of said shaft, a vertically presented saw blade mounted upon said shaft for reciprocal movement therewith, said blade extending at its upper end beyond the upper end of said shaft, a wheel carried on said plate for radial extension therebeyond, means providing for rotation of said wheel circumferentially about said plate, and work support means for an arcuate workpiece supported from said wheel.

2. A scroll saw as defined in claim 1 and further characterized by said shaft being eccentric with relationship to said plate, mounting means provided on said shaft for said blade for presenting the vertical axis of said blade in substantial alignment with the center of said plate, and guide means for said blade for maintaining same in a vertical path during operation.

3. A scroll saw as defined in claim 1 and further characterized by said work support means comprising a pair of elongate members disposed downwardly of said wheel in axial parallel relationship and on opposite sides of said upright, means depending from said wheel for supporting said elongate members and first and second work engaging members mounted upon said elongate members at their opposite ends, means for effecting slideable engagement between said work engaging members and said elongate members so that the former may be moved relatively toward and away from each other for accommodating a workpiece therebetween.

4. A scroll saw as defined in claim 3 and further characterized by each of said first and second work engaging members having a plurality of clamping members positioned spacedly from each other along an arc for engaging proximate end portions of the workpiece.

5. A scroll saw as defined in claim 4 and further characterized by said first and second work engaging members comprising an inner annular member mounted upon said elongate members, an outer annular member, means for effecting relative rotational movement of said outer annular member about said inner annular member, said clamping members being carried upon the inwardly directed faces of said outer annular members.

6. A scroll saw as defined in claim 4 and further characterized by said means mounting said work engaging inner annular members upon said elongate members comprising sleeve elements, each of said sleeve elements having a bushing for rendering said inner annular member slideable along said elongate members axially thereof.

7. A scroll saw as defined in claim 6 and further characterized by spring means for biasing said inner annular member into the relative initial position with respect to said outer annular member.

8. A scroll saw as defined in claim 7 and further characterized by said spring means comprising a flat spring, means engaging the lower end of said spring to said inner annular member and means mounted on the upper portion of said outer annular member for engaging the upper end of said spring.

References Cited

UNITED STATES PATENTS 1,515,619  11/1924  Runnels _____ 83—427

WILLIAM S. LAWSON, Primary Examiner

L. GILDEN, Assistant Examiner

U.S. Cl. X.R.

83—427, 647, 648